(12) United States Patent
Hashimoto et al.

(10) Patent No.: US 10,209,729 B2
(45) Date of Patent: Feb. 19, 2019

(54) ENERGY CONTROL SYSTEM, ENERGY CONTROL DEVICE, ENERGY CONTROL METHOD, AND STORAGE MEDIUM

(71) Applicant: NEC Corporation, Tokyo (JP)

(72) Inventors: Ryo Hashimoto, Tokyo (JP); Hitoshi Yano, Tokyo (JP); Koji Kudo, Tokyo (JP); Hisato Sakuma, Tokyo (JP)

(73) Assignee: NEC Corporation, Tokyo (JP)

( * ) Notice: Subject to any disclaimer, the term of this patent is extended or adjusted under 35 U.S.C. 154(b) by 122 days.

(21) Appl. No.: 15/306,369

(22) PCT Filed: Mar. 31, 2015

(86) PCT No.: PCT/JP2015/060139
§ 371 (c)(1),
(2) Date: Oct. 24, 2016

(87) PCT Pub. No.: WO2015/166758
PCT Pub. Date: Nov. 5, 2015

(65) Prior Publication Data
US 2017/0045903 A1    Feb. 16, 2017

(30) Foreign Application Priority Data
Apr. 28, 2014 (JP) .................................. 2014-092795

(51) Int. Cl.
*G05D 3/12*    (2006.01)
*G05D 5/00*    (2006.01)
(Continued)

(52) U.S. Cl.
CPC .................. *G05F 1/66* (2013.01); *H02J 3/14* (2013.01); *H02J 13/00* (2013.01);
(Continued)

(58) Field of Classification Search
CPC ................ H02J 3/14; F24J 2/00; G05B 15/02
(Continued)

(56) References Cited

U.S. PATENT DOCUMENTS

2009/0198385 A1* 8/2009 Oe .......................... G06F 1/28
                                                       700/296
2010/0217485 A1   8/2010 Ichishi
(Continued)

FOREIGN PATENT DOCUMENTS

EP    2219278 A1    8/2010
EP    2 429 053 A2  3/2012
(Continued)

OTHER PUBLICATIONS

International Search Report corresponding to PCT/JP2015/060139, dated Jun. 16, 2015 (5 pages).
(Continued)

*Primary Examiner* — Mohammad Ali
*Assistant Examiner* — Md Azad
(74) *Attorney, Agent, or Firm* — Wilmer Cutler Pickering Hale and Dorr LLP

(57) ABSTRACT

Lower-level information processing devices (20-1 to 20-n) obtain parameters used for estimating power consumption in accordance with the statuses of electric devices (30-1 to 30-n), estimate the power consumption of the electric devices (30-1 to 30-n) on the basis of the parameters, and transmits the estimated value of the estimated power consumption to an upper-level information processing device (10). The upper-level information processing device (10) determines an assignment of distribution of supply and demand on the basis of the power supply-demand capacity in a predetermined power network and the estimated value of the power consumption and transmits the determined assignments to the lower-level information processing
(Continued)

devices (20-1 to 20-*n*). The lower-level information processing devices (20-1 to 20-*n*) controls the operations of the electric devices (30-1 to 30-*n*) on the basis of the assignment of distribution of supply and demand.

7 Claims, 11 Drawing Sheets

(51) Int. Cl.

| | | |
|---|---|---|
| *G05D 9/00* | (2006.01) | |
| *G05D 11/00* | (2006.01) | |
| *G05D 17/00* | (2006.01) | |
| *G05F 1/66* | (2006.01) | |
| *H02J 3/14* | (2006.01) | |
| *H02J 13/00* | (2006.01) | |
| *F24J 2/00* | (2014.01) | |

(52) U.S. Cl.
CPC ............ *H02J 13/0079* (2013.01); *F24J 2/00* (2013.01); *H02J 2003/143* (2013.01)

(58) Field of Classification Search
USPC ........................................................ 700/286
See application file for complete search history.

(56) References Cited

U.S. PATENT DOCUMENTS

| | | | | |
|---|---|---|---|---|
| 2011/0172837 A1* | 7/2011 | Forbes, Jr. | ............ | G06Q 10/00 700/291 |
| 2011/0276818 A1* | 11/2011 | Yamamoto | .......... | G06F 11/3055 713/340 |
| 2012/0004784 A1 | 1/2012 | Oh et al. | | |
| 2012/0065800 A1 | 3/2012 | Baba et al. | | |
| 2012/0290232 A1* | 11/2012 | Kudo | ..................... | G01D 4/002 702/62 |
| 2012/0326505 A1* | 12/2012 | Otsuki | ....................... | H02J 3/28 307/31 |
| 2013/0009485 A1* | 1/2013 | Sakuma | .................... | H02J 3/32 307/81 |
| 2014/0039699 A1* | 2/2014 | Forbes, Jr. | ............. | G05B 19/02 700/286 |
| 2014/0217823 A1* | 8/2014 | Baba | ........................ | H02J 3/14 307/35 |
| 2014/0371933 A1* | 12/2014 | Iwamura | ............... | G06F 1/3209 700/291 |
| 2015/0200544 A1* | 7/2015 | Kitaji | ....................... | H02J 3/14 700/295 |

FOREIGN PATENT DOCUMENTS

| | | |
|---|---|---|
| JP | 2009-136109 A | 6/2009 |
| JP | 2012-014701 A | 1/2012 |
| JP | 2012-065407 A | 3/2012 |
| JP | 2012-255567 A | 12/2012 |
| JP | 2013-009565 A | 1/2013 |

OTHER PUBLICATIONS

Written Opinion corresponding to PCT/JP2015/060139, dated Jun. 16, 2015 (8 pages).

Notification of Reasons for Refusal issued by the Japan Patent Office for Japanese Application No. 2016-515905 dated Aug. 21, 2018 (6 pages).

\* cited by examiner

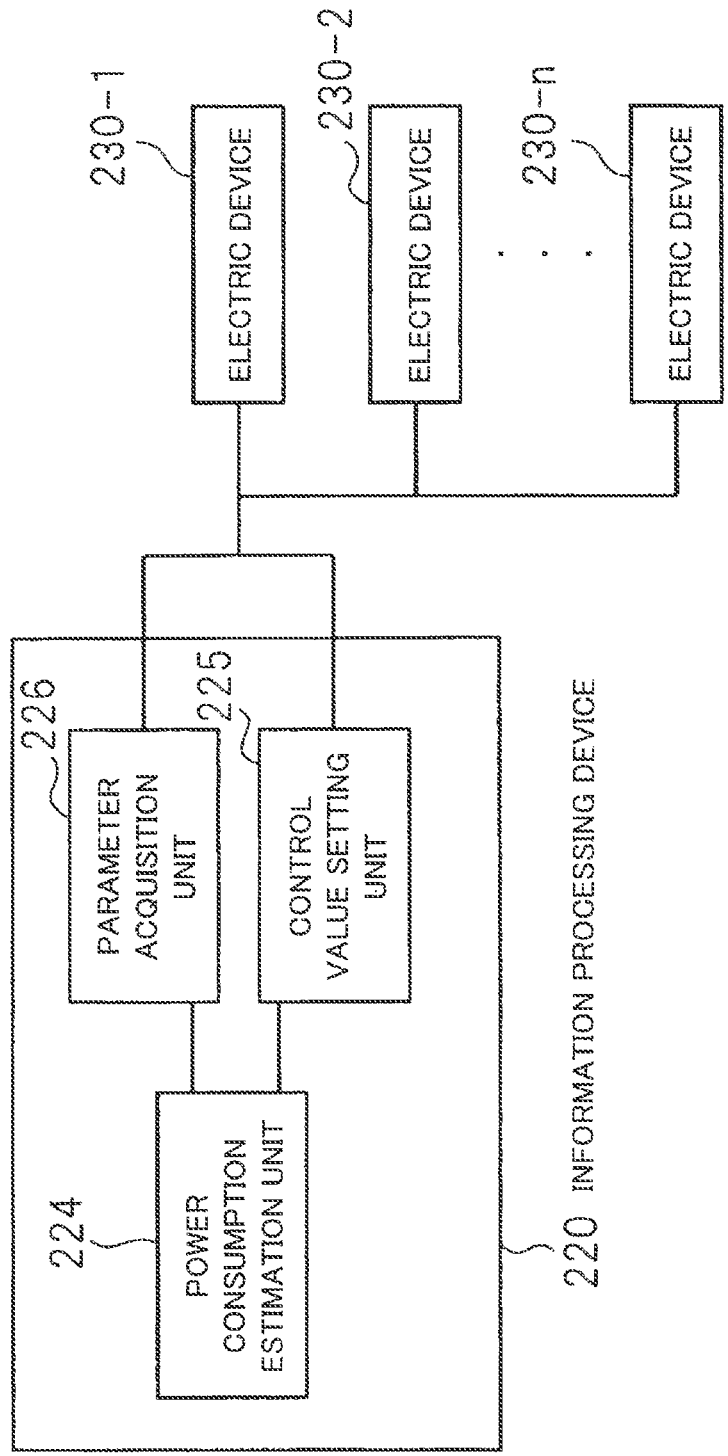

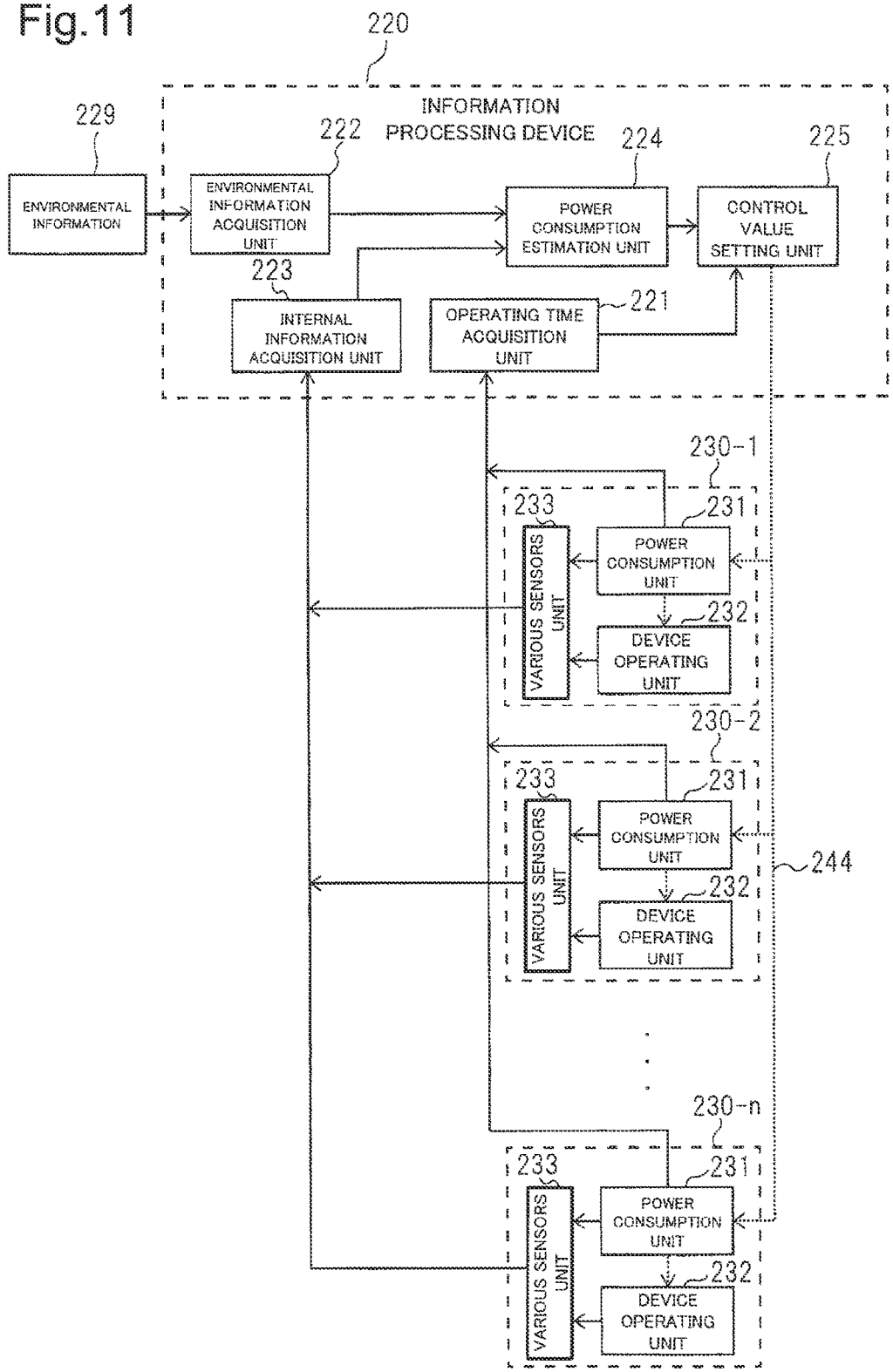

ENERGY CONTROL SYSTEM, ENERGY CONTROL DEVICE, ENERGY CONTROL METHOD, AND STORAGE MEDIUM

CROSS-REFERENCE TO RELATED APPLICATIONS

This application is a national stage application of International Application No. PCT/JP2015/060139 entitled "ENERGY CONTROL SYSTEM, ENERGY CONTROL DEVICE, ENERGY CONTROL METHOD, AND STORAGE MEDIUM" filed on Mar. 31, 2015, which claims the benefit of the priority of Japanese Patent Application No. 2014-092795, filed on Apr. 28, 2014, the disclosures of each of which are hereby incorporated by reference in their entirety.

TECHNICAL FIELD

The present invention relates to an energy control system, an energy control device, an energy control method, and a program that support the setting of a demand schedule of power.

BACKGROUND ART

In order to operate a power system stably, supply and demand of power need to be matched. Therefore, power supply is generally controlled in accordance with power demand on the consumer side.

In contrast, the number of power generation methods using renewable energy, such as photovoltaic power generation and wind power generation, is on the increase recently. In these power generation methods, it is difficult to control the amount of power generation, and it is difficult to keep supply-and-demand balance of power using only a general method.

As a means for solving these problems, there is demand response that performs suppression of power demand and induction of power demand of consumer's devices using a signal from outside (for example, refer to PTL 1).

The consumer's devices that contribute to the entire power system in the foregoing demand response are, for example, heat pump-mounted devices, such as a water heater and an air conditioner. These devices consume a large amount of power per one device. Thus, these devices are regarded as being important as devices that certainly produce the effect of the demand response by increasing or decreasing power consumption in accordance with power supply.

CITATION LIST

Patent Literature

[PTL 1]: JP 2012-255567 A

SUMMARY OF INVENTION

Technical Problem

However, in the consumer's devices such as the heat pump-mounted devices, the power consumption varies from hour to hour in accordance with statuses of a surrounding environment and the like. Thus, there is a problem in that it is difficult to perform the above-described demand response effectively and quantitatively. For example, in a heat pump water heater, a large difference in power consumption occurs due to a change in an external environment, such as temperature and humidity, or a change in temperature inside a water heater tank.

Thus, in order to absorb a fluctuation of loading of the power system, for example, it is difficult to accurately generate aimed power demand in the heat pump water heater. For example, when the output of photovoltaic power generation or wind power generation connected to the power system is suddenly reduced due to a change in weather, in the case where the operation of the heat pump water heater is urgently stopped, or the like, it is difficult to grasp how much power demand can be reduced. Therefore, it is assumed that it is difficult to perform the demand response using the consumer's devices effectively.

It is an object of the present invention to provide an energy control system, an energy control device, an energy control method, and a program that solve the above-described problem.

Solution to Problem

In order to achieve the above-described object, an energy control system of the present invention includes:
  a lower-level information processing device that controls operation of an electric device to adjust power supply with respect to the electric device; and
  an upper-level information processing device that communicates with the lower-level information processing device, wherein
  the lower-level information processing device acquires a parameter for estimating power consumption in accordance with a status of the electric device, estimates the power consumption of the electric device on the basis of the parameter, and transmits estimated value of the estimated power consumption to the upper-level information processing device,
  the upper-level information processing device determines, on the basis of a power supply-and-demand capacity in a predetermined power network and the estimated value, an assignment of distribution of supply and demand of power of the electric device in the power network, and transmits the determined assignment to the lower-level information processing device, and
  the lower-level information processing device controls the operation of the electric device on the basis of the assignment to adjust the power supply with respect to the electric device.

An energy control device of the present invention includes:
  parameter acquisition unit that acquires, with respect to at least two electric devices, parameters for estimating power consumption in accordance with statuses of the electric devices;
  power consumption estimation unit that estimates the power consumption of the electric devices on the basis of the parameters; and
  control value setting unit that determines, on the basis of a power Supply-and-demand capacity in a predetermined power network and the estimated values, assignments of distribution of Supply and demand of power of the electric devices in the power network, and controls operations of the electric devices on the basis of the assignments to adjust power Supply with respect to the electric devices.

An energy control method of the present invention includes:

parameter acquisition processing of acquiring, with respect to at least two electric devices, parameters for estimating power consumption in accordance with statuses of the electric devices;

power consumption estimation processing of estimating the power consumption of the electric devices on the basis of the parameters;

assignment determination processing of determining, on the basis of a power supply-and-demand capacity in a predetermined power network and the estimated values, assignments of distribution of supply and demand of power of the electric devices in the power network; and adjustment processing of controlling operations of the electric devices on the basis of the assignments to adjust power supply with respect to the electric devices.

In a storage medium of the present invention, a program that makes a computer execute:

a parameter acquisition procedure for acquiring, with respect to at least two electric devices, parameters for estimating power consumption in accordance with statuses of the electric devices;

a power consumption estimation procedure for estimating the power consumption of the electric devices on the basis of the parameters;

an assignment determination procedure for determining, on the basis of a power supply-and-demand capacity in a predetermined power network and the estimated values, assignments of distribution of supply and demand of power of the electric devices in the power network; and an adjustment procedure for controlling operations of the electric devices on the basis of the assignments to adjust power supply with respect to the electric devices, is stored.

Advantageous Effects of Invention

According to the present invention, demand response can be performed effectively and quantitatively.

BRIEF DESCRIPTION OF DRAWINGS

FIG. 10 is a diagram illustrating a basic configuration of an information processing device that performs energy control without using an upper-level information processing device.

FIG. 11 is a block diagram illustrating a functional configuration of the information processing device illustrated in FIG. 10.

DESCRIPTION OF EMBODIMENT

Hereinafter, exemplary embodiments of the present invention will be described with reference to the drawings.

In the following description, each component of each device indicates a block of a functional unit rather than a configuration of a hardware unit. Each component of each device is achieved by an arbitrary combination of hardware and software, including a CPU (Central Processing Unit), a memory, a program loaded on the memory, which achieves components of the drawings, a storage medium, such as a hard disk, which stores the program, an interface for network connection, and the like of an arbitrary computer. There are various modifications in the achievement method and devices thereof.

Figure 1:
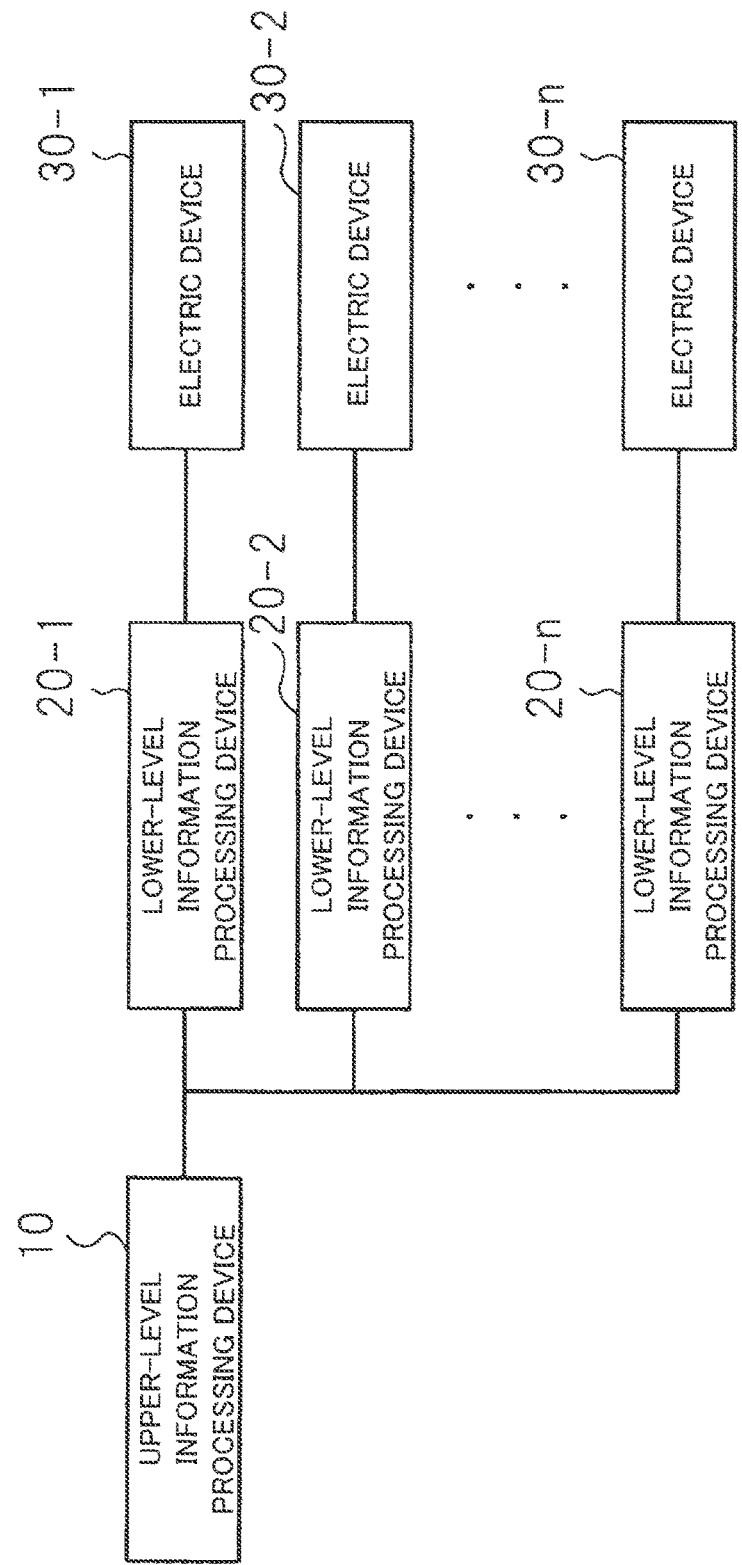
FIG. 1 is a block diagram illustrating a basic configuration of an energy control system of the present invention.

FIG. 1 is a block diagram illustrating a basic configuration of an energy control system of the present invention.

As illustrated in FIG. 1, the energy control system of the present invention has an upper-level information processing device 10 and lower-level information processing devices 20-1 to 20-n.

Electric devices 30-1 to 30-n are respectively connected to the lower-level information processing devices 20-1 to 20-n. The lower-level information processing devices 20-1 to 20-n communicate with the upper-level information processing device 10. With respect to the connected electric devices 30-1 to 30-n, the lower-level information processing devices 20-1 to 20-n acquire parameters for estimating power consumption in accordance with statuses of the electric devices 30-1 to 30-n. Then, the lower-level information processing devices 20-1 to 20-n estimate the power consumption of the electric devices 30-1 to 30-n on the basis of the acquired parameters, and transmit estimated values of the estimated power consumption to the upper-level information processing device 10. The lower-level information processing devices 20-1 to 20-n control operations of the electric devices 30-1 to 30-n on the basis of assignments of distribution of supply and demand transmitted from the upper-level information processing device 10 to adjust power supply with respect to the electric devices 30-1 to 30-n.

The electric devices 30-1 to 30-n are, for example, general electric household appliances, such as a heat pump water heater, an air conditioner, and an electric light, and electric devices that consume power, such as office devices and factory machines. The operations of the electric devices 30-1 to 30-n are controlled in accordance with the distribution of supply and demand assigned by the energy control system of the present invention.

The upper-level information processing device 10 determines, on the basis of a power supply-and-demand capacity in a predetermined power network and the estimated values transmitted from the lower-level information processing devices 20-1 to 20-n, the assignments of distribution of supply and demand of power to the electric devices 30-1 to 30-$n$ in the power network. Then, the upper-level information processing device 10 transmits the determined assignments to the lower-level information processing devices 20-1 to 20-$n$.

As just described, in the energy control system illustrated in FIG. 1, the assignments of distribution of supply and demand of the power of the electric devices 30-1 to 30-$n$ in the power network are determined on the basis of the parameters in accordance with the statuses of the electric devices 30-1 to 30-$n$ and the power supply-and-demand capacity in the predetermined power network. Accordingly, demand response can be performed effectively and quantitatively even in a power network including electric devices whose power consumption varies from hour to hour in accordance with statuses of a surrounding environment and the like.

Hereinafter, the above-described energy control system will be described by taking the specific exemplary embodiments as examples.

First Exemplary Embodiment

Figure 2:
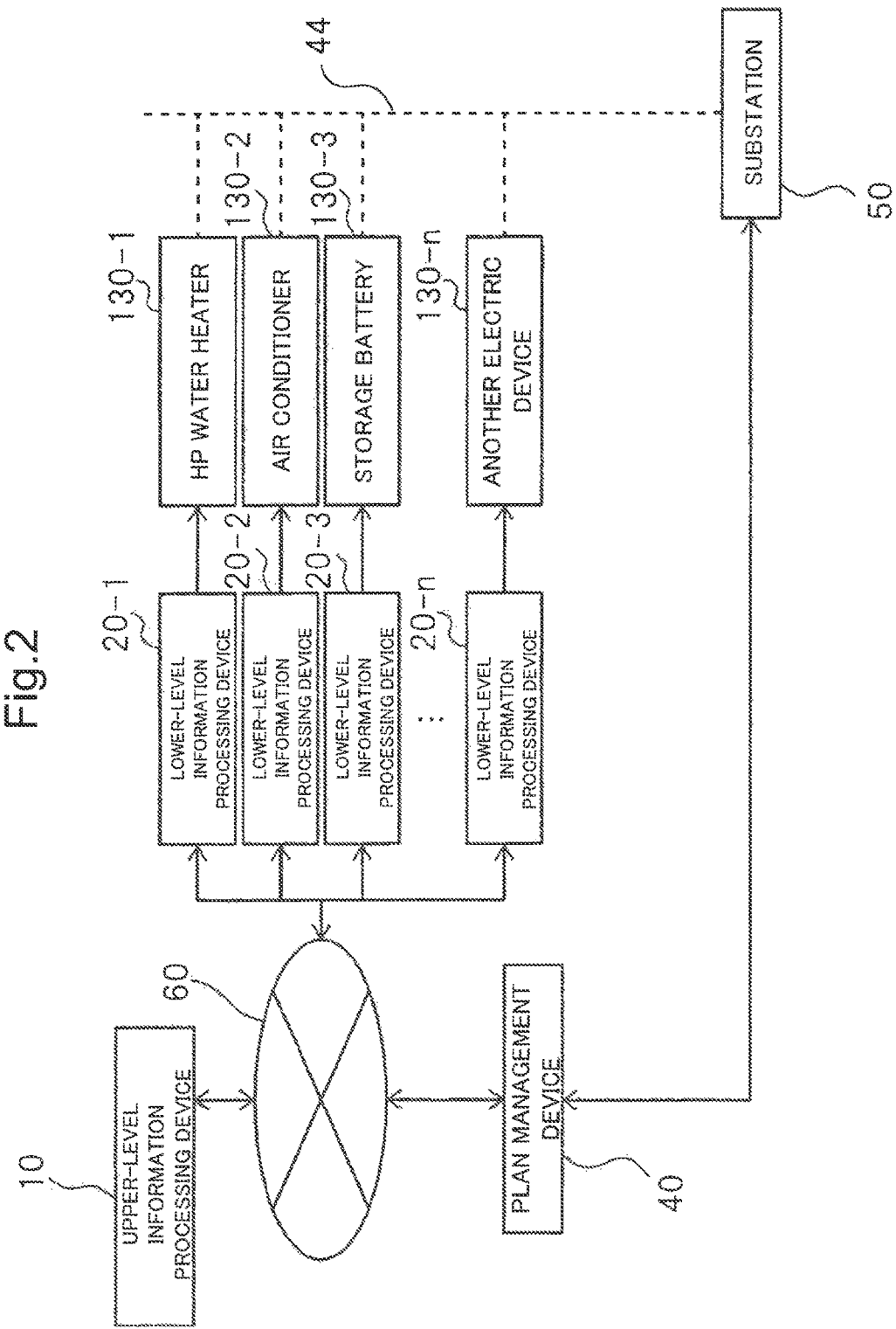
FIG. 2 is a diagram illustrating a first exemplary embodiment of the energy control system of the present invention.

FIG. 2 is a diagram illustrating a first exemplary embodiment of the energy control system of the present invention.

As illustrated in FIG. 2, the energy control system in the exemplary embodiment has the upper-level information processing device 10 and the lower-level information processing devices 20-1 to 20-$n$ illustrated in FIG. 1, and further has a plan management device 40 and a substation 50. Specific examples of the electric devices 30-1 to 30-$n$ illustrated in FIG. 1 include a heat pump water heater 130-1, an air conditioner 130-2, a storage battery 130-3, and another electric device 130-$n$. The heat pump water heater 130-1, the air conditioner 130-2, the storage battery 130-3, and the another electric device 130-$n$ are connected to a power network 44. The upper-level information processing device 10, the lower-level information processing devices 20-1 to 20-$n$, and the plan management device 40 may each be one computer.

The plan management device 40 is a device that determines an operating plan of the entire system. The plan management device 40 grasps the setting of the amount of power generation of a power plant and the amount of power transmission of the substation 50. The plan management device 40 communicates with the upper-level information processing device 10 and determines distribution of supply and demand to assign all consumers.

The upper-level information processing device 10 communicates with the lower-level information processing devices 20-1 to 20-$n$ and the plan management device 40 through a communication network 60.

Specifically, the upper-level information processing device 10 acquires a predicted value of the amount of system loading, which is predicted in advance, from the plan management device 40. The predicted value of the amount of system loading is the power supply-and-demand capacity in the power network 44, and indicates a predicted value of a change in power demand consumed by the entire power system in a targeted period of power supply-and-demand adjustment. Alternatively, the upper-level information processing device 10 acquires a power price at each time, which is determined on the basis of the predicted value of the amount of system loading, or a price at each time, which corresponds to the distribution of supply and demand determined on the basis of the predicted value of the amount of system loading. The targeted period of power supply-and-demand adjustment is, for example, a part of time of a day when tight demand is expected, or a day when a large demand fluctuation is expected. As the predicted value of the amount of system loading, a value obtained by subtracting a predicted value of a change in the amount of power generation of renewable energy of photovoltaic power generation, wind power generation, or the like from the predicted value of a change in demand of the entire power system may be used.

At the same time, the upper-level information processing device 10 acquires estimated values of the power consumption of the respective electric devices 30-1 to 30-$n$ in the targeted period, or estimated values of the power consumption when the respective electric devices 30-1 to 30-$n$ are controlled in the targeted period, from the lower-level information processing devices 20-1 to 20-$n$.

The upper-level information processing device 10 creates an appropriate distribution plan by determining the assignments of distribution of supply and demand to the electric devices 30-1 to 30-$n$ on the basis of the predicted value of the amount of system loading and the estimated values of the power consumption. Then, the upper-level information processing device 10 transmits an operating schedule according to the distribution plan to the lower-level information processing devices 20-1 to 20-$n$. Specifically, the upper-level information processing device 10 determines the assignments of distribution of supply and demand to the electric devices 30-1 to 30-$n$ such that the load is increased at time when the predicted value of the amount of system loading is small, and the load is decreased at time when the predicted value of the amount of system loading is large. The assignments of distribution of supply and demand may be determined such that an electric device having the power efficiency at a certain level or more operates at a time when the power supply of the entire power network is a predetermined value or more, and an electric device having the power efficiency at less than the certain level operates at a time when the power supply of the entire power network is less than the predetermined value. The power efficiency of the electric device can be recognized by power efficiency information indicating power efficiency, which is included in operating condition information of the electric device acquired by the lower-level information processing device, described below. A fluctuation of the power consumption can be suppressed by the foregoing configuration.

Figure 3:
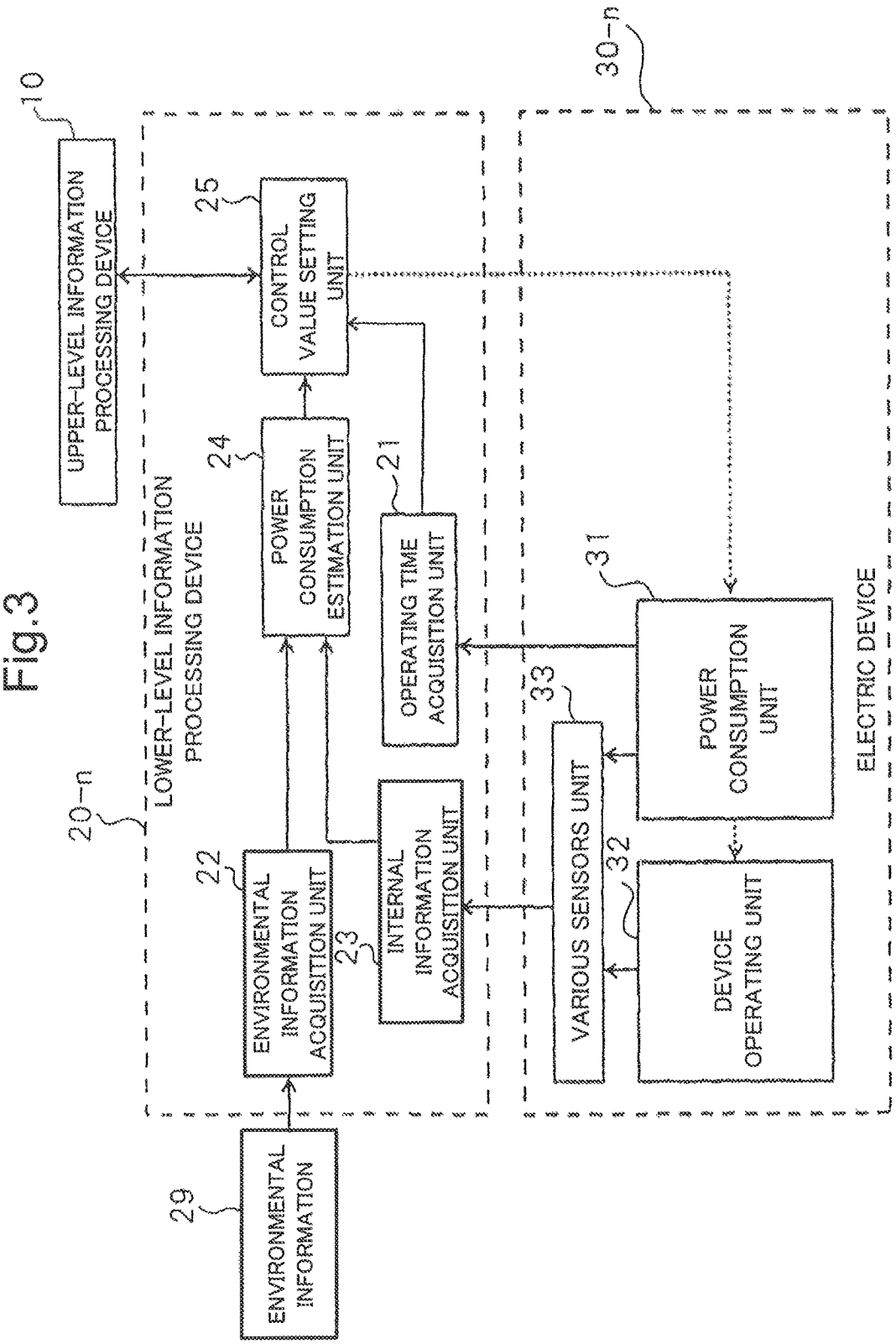
FIG. 3 is a block diagram illustrating a functional configuration of lower-level information processing devices illustrated in FIG. 2.

FIG. 3 is a block diagram illustrating a functional configuration of the lower-level information processing devices 20-1 to 20-$n$ illustrated in FIG. 2. Although the configuration of the lower-level information processing device 20-$n$ is illustrated in FIG. 3, the configurations of other lower-level information processing devices are the same as the configuration of the lower-level information processing device 20-$n$.

As illustrated in FIG. 3, each of the lower-level information processing devices 20-1 to 20-$n$ includes an operating time acquisition unit 21, an environmental information acquisition unit 22, an internal information acquisition unit 23, a power consumption estimation unit 24, and a control value setting unit 25. The operating time acquisition unit 21, the environmental information acquisition unit 22, and the internal information acquisition unit 23 correspond to a parameter acquisition means of the present invention.

The operating time acquisition unit 21 corresponds to an operating time acquisition means of the present invention. For the electric device 30-1 to 30-$n$ that are targets to be controlled, the operating time acquisition unit 21 acquires time information indicating scheduled operating time at which a consumer uses the device. For example, the scheduled operating time may be set by the consumer. Alternatively, a value predicted from an estimated consumer's behavior or the like may be used as the scheduled operating time. Regarding a device in which power consumption is generated at a time when the consumer wants to use the device. Such as an electric light or an air conditioner, the time when the consumer wants to use the device is the scheduled operating time. On the other hand, regarding a device that the consumer uses after a certain amount of energy is accumulated until certain time, for example, charging of a water heater with a hot water storage tank or an electric vehicle, the scheduled operating time can be defined by specifying the latest time among times when the operation should be terminated and the amount of accumulated energy required at that time.

The environmental information acquisition unit 22 corresponds to an environmental information acquisition means of the present invention. The environmental information acquisition unit 22 acquires environmental information 29 that influences on the power consumption of the electric device. The environmental information that influences on the power consumption of the device is, for example, the ambient temperature, the ambient humidity, the amount of solar radiation, and the like in the vicinity of the electric device. When the power consumption of the electric device varies with consumers, seasons, times, or the like, a behavior model of the consumer or time information may be acquired as the environmental information. When the environmental information is real-time information, the environmental information acquisition unit 22 can directly measure the environmental information. Alternatively, when the environmental information is a future predicted value, the environmental information acquisition unit 22 can acquire the environmental information by using prediction using a time series analysis, machine learning, or the like, or generally-released forecast information. The environmental information acquisition unit 22 acquires at least one of the pieces of the above-described environmental information.

The internal information acquisition unit 23 acquires operating condition information indicating operating conditions of the electric device and a device operating unit. The operating condition information of the electric device is, for example, the operating power [W], the power consumption [Wh], and the like of the electric device. The operating condition information of the device operating unit is, for example, information of the temperature, the amount of charge, and the like of a mounted storage battery in the case of an electric vehicle, or the shape of a room, information of room temperature distribution, and the like in the case of an air conditioner. The operating condition information includes the power efficiency information indicating the power efficiency of the electric device.

The power consumption estimation unit 24 estimates the power consumption in the case where the electric device is operated hereafter, on the basis of the environmental information 29 acquired by the environmental information acquisition unit 22 and the internal information acquired by the internal information acquisition unit 23. For example, when it is expected that the supply-and-demand balance is negatively affected due to the surplus of the power of the photovoltaic power generation on the following day, the power consumption estimation unit 24 calculates in advance a change in the power consumption when the device is operated on the previous day. For example, when the amount of photovoltaic power generation on the current day becomes less than the prediction made on the previous day due to the influence of cloud or the like, the power consumption estimation unit 24 calculates how much power consumption is reduced hereafter in the case where the operation of the operating device is stopped, compared with the case where the operation is not stopped.

The control value setting unit 25 transmits the estimated value of the power consumption estimated by the power consumption estimation unit 24 and the time information acquired by the operating time acquisition unit 21 to the upper-level information processing device 10. The control value setting unit 25 may transmit at least the power efficiency information of the operating condition information acquired by the internal information acquisition unit 23 to the upper-level information processing device 10 together with the estimated value of the power consumption and the time information. The control value setting unit 25 controls the operation of the electric device on the basis of the assignments of distribution of supply and demand determined by the upper-level information processing device 10 to adjust the power supply with respect to the electric device. The control value setting unit 25 may adjust a control value of the electric device on the basis of the power consumption estimated by the power consumption estimation unit 24 and the time information acquired by the operating time acquisition unit 21. In this case, the control value setting unit 25 may control the electric device by internally calculating the control value of the electric device on the basis of the information of the power price transmitted from the upper-level information processing device 10.

The electric device 30-$n$ has a power consumption unit 31, a device operating unit 32, and a various sensors unit 33.

Hereinafter, the operation of the above-described energy control system will be described using a flow chart.

Figure 4:
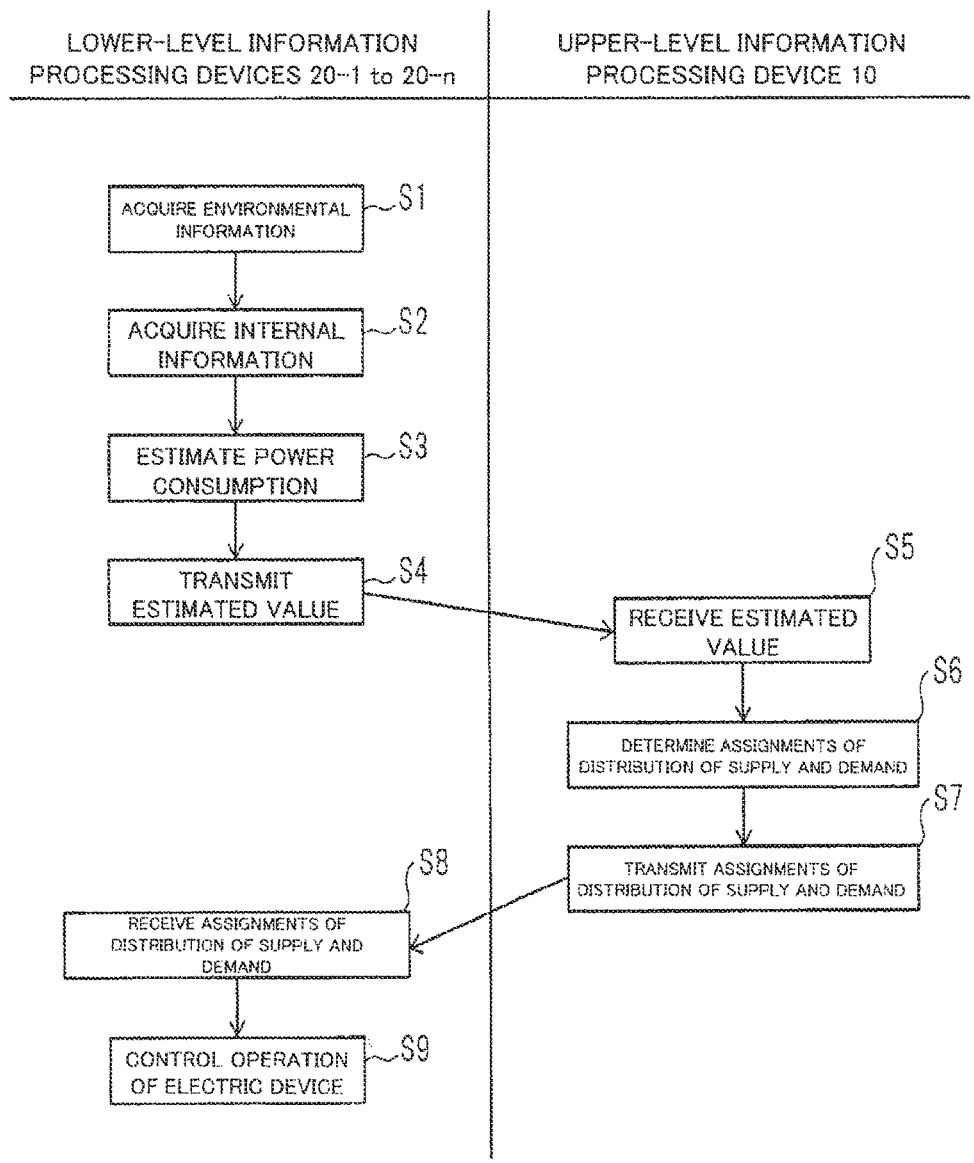
FIG. 4 is a flow chart for describing the operation of the energy control system illustrated in FIG. 2 and FIG. 3.

FIG. 4 is a flow chart for describing the operation of the energy control system illustrated in FIG. 2 and FIG. 3.

First, the environmental information acquisition unit 22 of each of the lower-level information processing devices 20-1 to 20-$n$ acquires the environmental information that influences on the power consumption of the connected electric device (Step 1). As described above, the environmental information is, for example, the ambient temperature, the ambient humidity, the amount of solar radiation, and the like in the vicinity of the electric device.

The internal information acquisition unit 23 of each of the lower-level information processing devices 20-1 to 20-$n$ acquires the operating condition information indicating the operating conditions of the electric device and the device operating unit (Step 2). As described above, the operating condition information of the electric device is, for example, the operating power [W], the power consumption [Wh], and the like of the electric device. As described above, the operating condition information of the device operating unit is, for example, information of the temperature, the amount of charge, and the like of a mounted storage battery in the case where the device operating unit is an electric vehicle, or the shape of a room, information of room temperature distribution, and the like in the case where the device operating unit is an air conditioner.

Next, the power consumption estimation unit 24 of each of the lower-level information processing devices 20-1 to 20-$n$ estimates the power consumption of the electric device on the basis of the environmental information acquired by the environmental information acquisition unit 22 and the internal information acquired by the internal information acquisition unit 23 (Step 3).

Next, the control value setting unit 25 of each of the lower-level information processing devices 20-1 to 20-$n$ transmits the estimated value of the power consumption estimated by the power consumption estimation unit 24 and the time information acquired by the operating time acquisition unit 21 to the upper-level information processing device 10 (Step 4).

When receiving the estimated values of the power consumption and the time information (Step 5), the upper-level information processing device 10 determines the assignments of distribution of supply and demand of the power to the electric devices in the power network 44 on the basis of the power supply-and-demand capacity in the power network 44 and the received estimated values of the power consumption (Step 6). As described above, the power supply-and-demand capacity in the power network 44 is acquired from the plan management device 40 by the upper-level information processing device 10. At this time, if the power efficiency information indicating the power efficiency of the electric device has been transmitted from the control value setting unit 25 of each of the lower-level information processing devices 20-1 to 20-n, the upper-level information processing device 10 may determine the assignments of distribution of supply and demand on the basis of the power efficiency of the electric devices. Specifically, the upper-level information processing device 10 may determine the assignments of distribution of supply and demand such that an electric device having the power efficiency at a certain level or more operates at a time when the power supply of the entire power network is a predetermined value or more, and an electric device having the power efficiency at less than the certain level operates at a time when the power supply of the entire power network is less than the predetermined value.

Then, the upper-level information processing device 10 transmits the determined assignments to the lower-level information processing devices 20-1 to 20-n (Step 7).

When the lower-level information processing devices 20-1 to 20-n receive the assignments of distribution of supply and demand from the upper-level information processing device 10 (Step 8), the control value setting unit 25 controls the operation of the connected electric device on the basis of the assignments of distribution of supply and demand (Step 9). Accordingly, each of the lower-level information processing devices 20-1 to 20-n adjusts the power supply with respect to the connected electric device.

The operation of the system when the generated power is tight will be described.

When it is found that the power is tight, the plan management device 40 requests demand restraint of the electric devices 30-1 to 30-n owned by the consumer.

Each of the lower-level information processing devices 20-1 to 20-n estimates, on the basis of the current operating condition of the connected electric device, the environmental information, and the internal information, a change in the power consumption in the case that the electric device is not stopped hereafter, and transmits the estimated value to the upper-level information processing device 10.

The upper-level information processing device 10 determines the amount of power reduction to be assigned to each of the electric devices 30-1 to 30-n or a device-operation stop instruction on the basis of the change in the power consumption of each of the electric devices 30-1 to 30-n, and transmits the amount of power reduction or the device-operation stop instruction to the lower-level information processing devices 20-1 to 20-n.

Then, the lower-level information processing devices 20-1 to 20-n control the operations of the electric devices 30-1 to 30-n in accordance with the amount of power reduction or the device-operation stop instruction transmitted from the upper-level information processing device 10.

Second Exemplary Embodiment

In a second exemplary embodiment, an example of the case where a heat pump water heater with a solar heat collector is a target to be controlled, and when generation of surplus of the power of the photovoltaic power generation is predicted on the previous day, the surplus is absorbed will be described.

Figure 5:
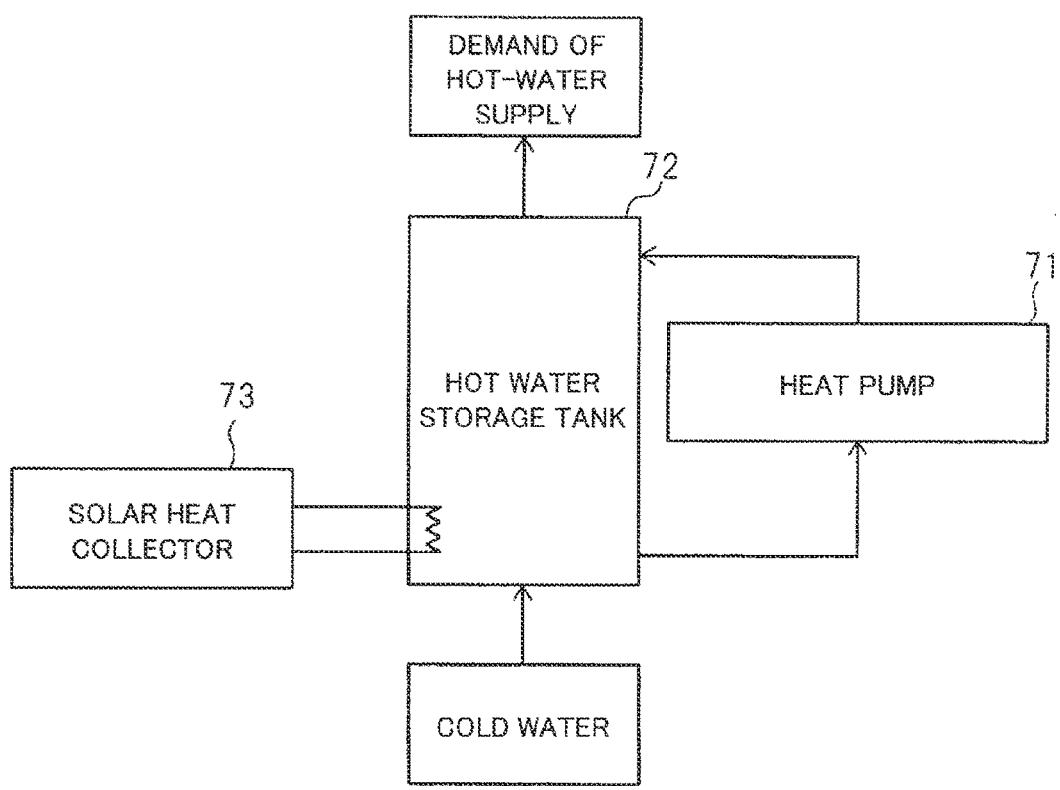
FIG. 5 is a block diagram for describing a functional configuration of a heat pump water heater controlled by the energy control system of the present invention.

FIG. 5 is a block diagram for describing a functional configuration of a heat pump water heater 70 controlled by the energy control system of the present invention.

As illustrated in FIG. 5, the heat pump water heater 70 in the present exemplary embodiment has a hot water storage tank 72, a heat pump 71, a solar heat collector 73, and a device including a sensor (not illustrated in the drawing).

The hot water storage tank 72 stores hot water.

The heat pump 71 draws water of the lower part of the hot water storage tank 72, and the water is heated to a boiling-up temperature using power and then is discharged into the upper part of the hot water storage tank 72.

The solar heat collector 73 raises the internal temperature of the hot water storage tank 72 using solar heat.

The sensor included in the device can at least set the boiling-up temperature, and furthermore, can detect temperatures of respective parts of the hot water storage tank 72.

The power of the heat pump water heater 70 configured as described above, as the heat pump water heater 130-1 illustrated in FIG. 2, is controlled by the lower-level information processing device 20-1.

Figure 6:
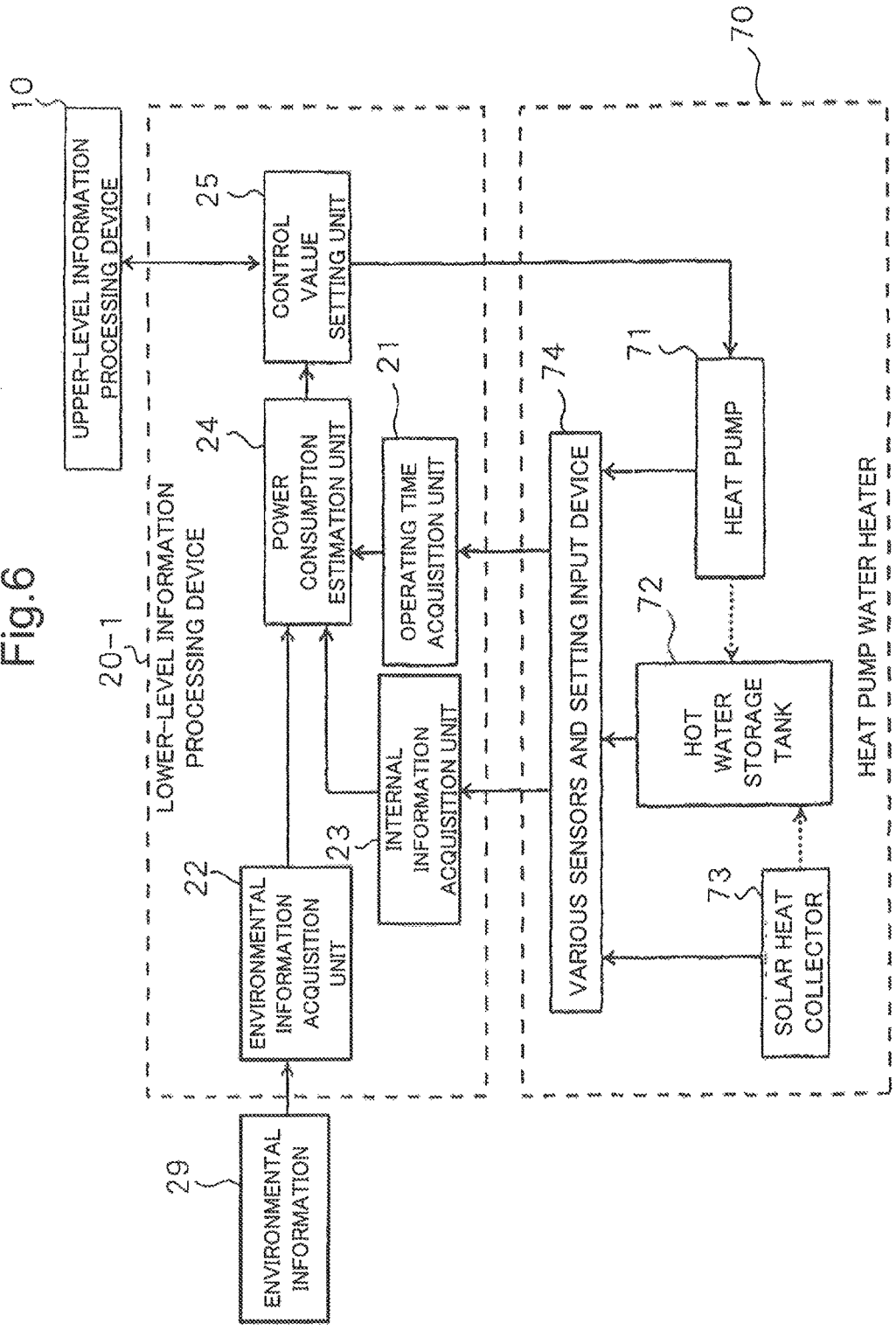
FIG. 6 is a block diagram for describing a functional configuration of the lower-level information processing device that controls power of the heat pump water heater illustrated in FIG. 5.

FIG. 6 is a block diagram for describing a functional configuration of the lower-level information processing device 20-1 that controls the power of the heat pump water heater 70 illustrated in FIG. 5.

As illustrated in FIG. 6, the lower-level information processing device 20-1 in the exemplary embodiment controls the heat pump water heater 70 as the electric device. The lower-level information processing device 20-1 includes the operating time acquisition unit 21, the environmental information acquisition unit 22, the internal information acquisition unit 23, the power consumption estimation unit 24, and the control value setting unit 25 as with the lower-level information processing device 20-n illustrated in FIG. 3. As described above, the heat pump water heater 70 has the hot water storage tank 72, the heat pump 71, the solar heat collector 73, and various sensors and setting input device 74.

The internal information acquisition unit 23 acquires the operating power of the heat pump water heater 70 and the internal temperature distribution of the hot water storage tank 72 from the sensors 74. The sensors 74 are connected to the hot water storage tank 72 and the heat pump 71, and thus, the internal information acquisition unit 23 can acquire the internal temperature distribution of the hot water storage tank 72 from the sensors 74.

The environmental information acquisition unit 22 acquires predicted values of the ambient temperature, the ambient humidity, and the amount of solar radiation from external weather forecasting data during the previous day of the control.

The operating time acquisition unit 21 acquires in advance minimum necessary demand of hot-water supply until each time.

The power consumption estimation unit 24 calculates an estimated value of the power consumption of the heat pump water heater 70 in the case where the device is operated at each time.

Here, the power consumption is estimated using Coefficient of Performance (COP) at each time.

First, the definition of COP in the system is expressed by the following equation (1). In equation (1), HP stands for heat pump.

[Math 1]

$$COP = \frac{\text{amount of heat acquired by hot water storage tank [kW]}}{\text{power consumption of } HP \text{ [kW]}} \qquad (1)$$

$$= \frac{\text{specific heat} \times \text{amount of water flowing in } HP}{\text{energy consumption of } HP} \times$$

$$(\text{boiling-up temperature of } HP - \text{inflow water temperature of } HP)$$

COP can be expressed as a relationship among the ambient temperature, the ambient humidity, the boiling-up temperature, and the inflow water temperature. For example, with respect to past record values of the ambient temperature, the ambient humidity, the boiling-up temperature, and the inflow water temperature acquired by the environmental information acquisition unit 22 and the internal information acquisition unit 23, linear approximation of COP, which is expressed by the following equation (2), is possible. Each of a, b, c, d, and e in the equation (2) represents a constant real number.

[Math 2]

$$COP \approx a \times \text{ambient temperature} + b \times \text{ambient humidity} + c \times \text{boiling up temperature } HP + d \times \text{inflow water temperature of } HP + e \qquad (2)$$

As another method, the relationship of COP to the values of the ambient temperature, the ambient humidity, the boiling-up temperature, and the inflow water temperature can also be calculated using a machine learning method, Such as a Support vector machine. Thus, the following equation (3) is expressed from the equation (1) and the equation (2).

[Math 3]

$$\text{power consumption} \approx \frac{A}{B} + e; \qquad (3)$$

$$A = \text{specific heat} \times \text{amount of water flowing in } HP \times$$
$$(\text{boiling-up temperature of } HP -$$
$$\text{inflow water temperature of } HP),$$
$$B = a \times \text{ambient temperature} + b \times \text{ambient humidity} +$$
$$c \times \text{boiling-up temperature of } HP +$$
$$d \times \text{inflow water temperature of } HP + e$$

The power consumption in the case where the electric device is operated at each time is largely determined from the equation (3) by the ambient temperature, the ambient humidity, the boiling-up temperature, and the inflow water temperature at the time. Here, the ambient temperature and the ambient humidity at each time are provided to the power consumption estimation unit 24 from the environmental information acquisition unit 22 as the predicted values, and the boiling-up temperature is a parameter relating to the control. Therefore, the power consumption estimation unit 24 can estimate the power consumption at each time by calculating the inflow water temperature at each time.

Since the inflow water temperature at each time depends on a past control result of the outflow water temperature, it is not preferable that the inflow water temperature be calculated with respect to numerous combinations of the setting of the outflow water temperature at each time. Thus, an example of a method of approximating the inflow water temperature at each time is provided here.

The method of approximating the inflow water temperature at each time can be mainly divided into two steps. In the first step, the temperature distribution inside the hot water storage tank 72 at each time in the case where the heat pump water heater 70 is not operated is calculated. In the second step, at every start time of the continuous operation of the heat pump water heater 70, the inflow water temperature at each time in the state where the heat pump water heater 70 is operated is determined on the basis of the temperature distribution inside the hot water storage tank 72 calculated in the first step.

Figure 7:
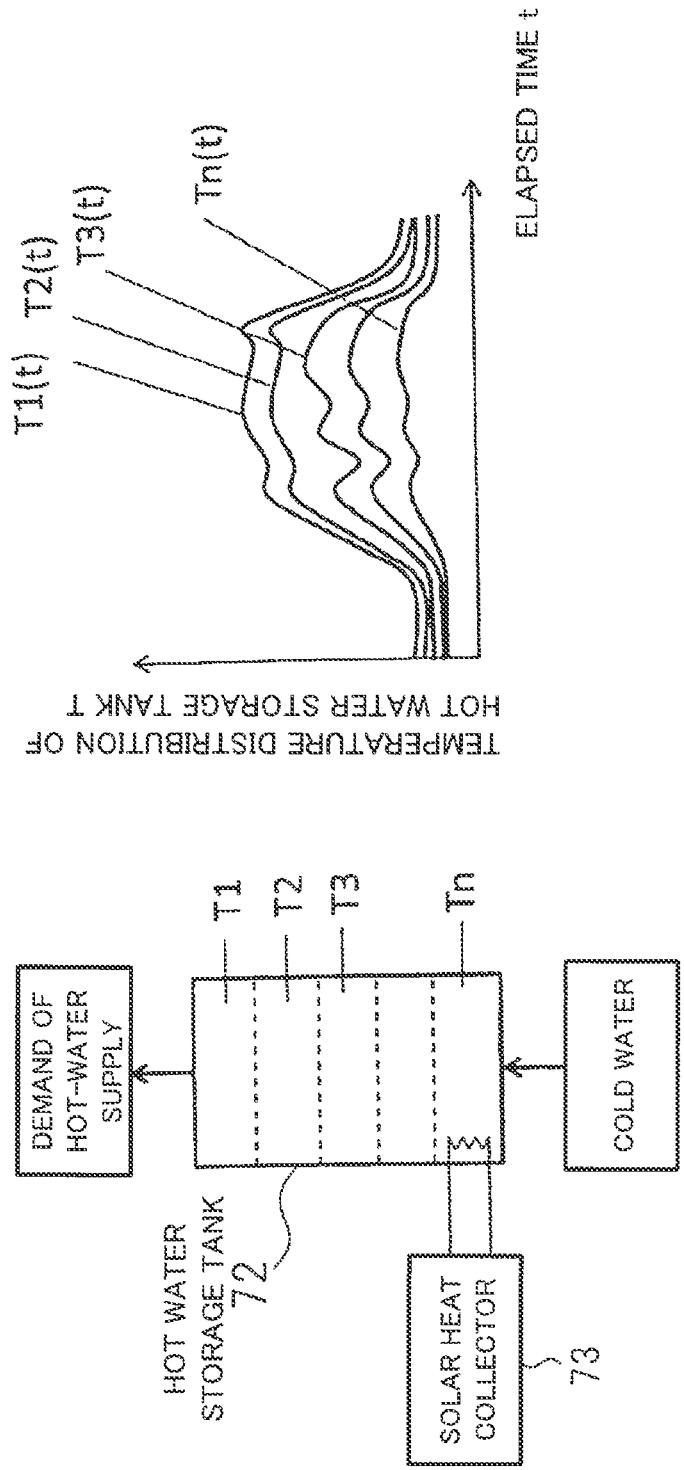
FIG. 7 is a diagram for describing a calculation method of temperature distribution inside a hot water storage tank in the case where the heat pump water heater illustrated in FIG. 5 is not operated.

FIG. 7 is a diagram for describing the calculation method of the temperature distribution inside the hot water storage tank 72 in the case where the heat pump water heater 70 illustrated in FIG. 5 is not operated.

In the first step, first, the temperature distribution inside the hot water storage tank 72 of the heat pump water heater 70 is divided into a plurality of layers as illustrated in FIG. 7. Then, time evolution of each of temperatures T1 to Tn of the layers is solved on the assumption that the state where the heat pump water heater 70 is not operated continues hereafter. Models that are targets at this time are the flow of heat inside the hot water storage tank 72, the heat loss of the hot water storage tank 72, the amount of heat generation of the solar heat collector 73, and the demand for hot-water supply. The models that handle them can be sequentially calculated by the predicted values of the ambient temperature, the ambient humidity, the amount of solar radiation, and the demand for hot-water supply at each time, and the initial state of the temperature distribution inside the hot water storage tank 72, and the temperature distribution inside the hot water storage tank 72 at each time can be calculated.

Figure 8:
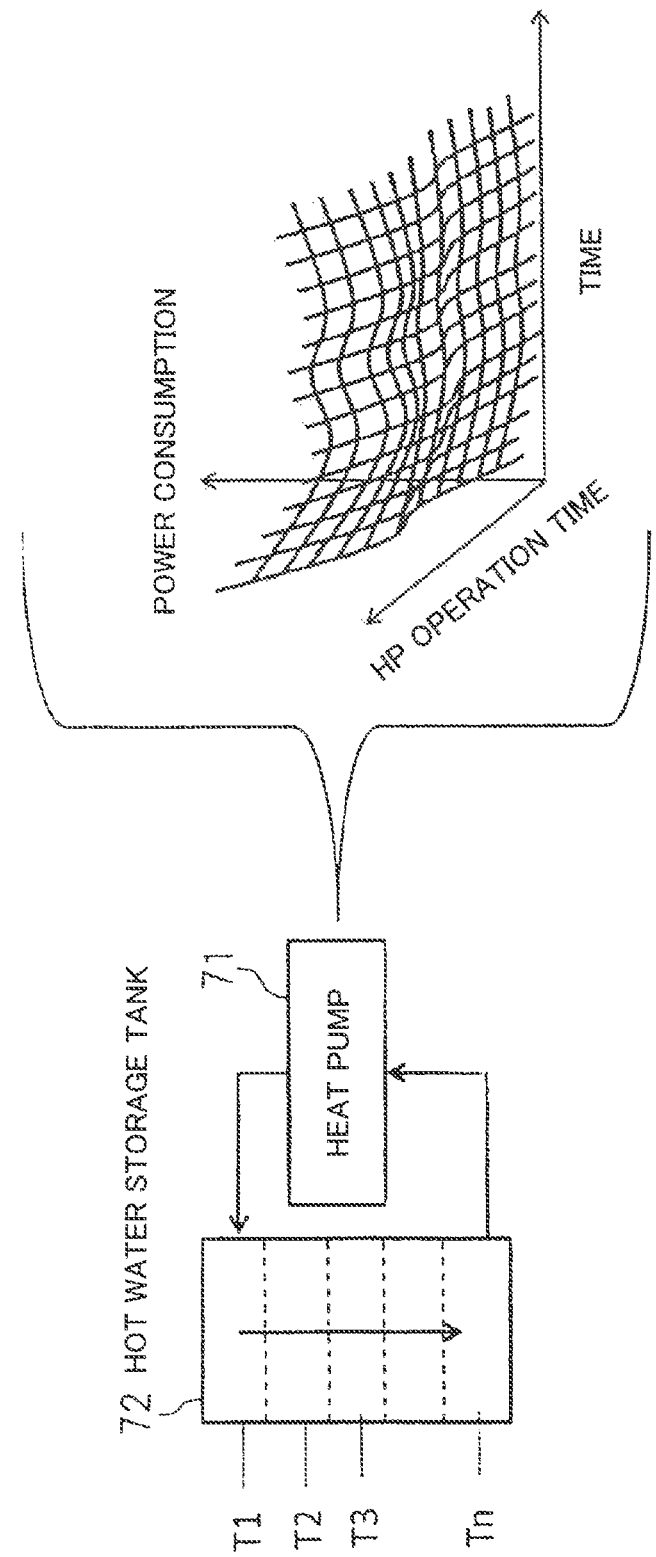
FIG. 8 is a diagram for describing an estimation method of power consumption at each time of the heat pump water heater illustrated in FIG. 5.

FIG. 8 is a diagram for describing the estimation method of the power consumption at each time of the heat pump water heater 70 illustrated in FIG. 5.

In the second step, the inflow water temperature at each time in the case where the water inside the hot eater storage tank 72 is used in order from the bottom on the assumption that the operation of the heat pump water heater 70 is started at a certain time at a constant boiling start temperature is calculated. In other words, the equation (3) is calculated on the assumption that the inflow water temperature varies in descending order from Tn. This operation is performed with respect to each time step. Accordingly, three-dimensional information of the estimated value of the power consumption centering on time and operation elapsed time of the heat pump water heater 70 as illustrated in FIG. 8 can be calculated. The power can be controlled in consideration of the time and the operation elapsed time of the heat pump water heater 70 by the foregoing configuration.

As just described, in the exemplary embodiment, the power consumption estimation unit 24 calculates the inside state of the heat pump water heater 70 in the case where the heat pump water heater 70 is not operated. The power consumption estimation unit 24 estimates the power consumption in the case where the heat pump water heater 70 is then operated, on the basis of the inside state.

In the present exemplary embodiment, the control value setting unit 25 does not transmit the power consumption estimated by the power consumption estimation unit 24 to the upper-level information processing device 10, and controls the heat pump water heater 70 on the basis of the power consumption estimated by the power consumption estimation unit 24.

Figure 9:
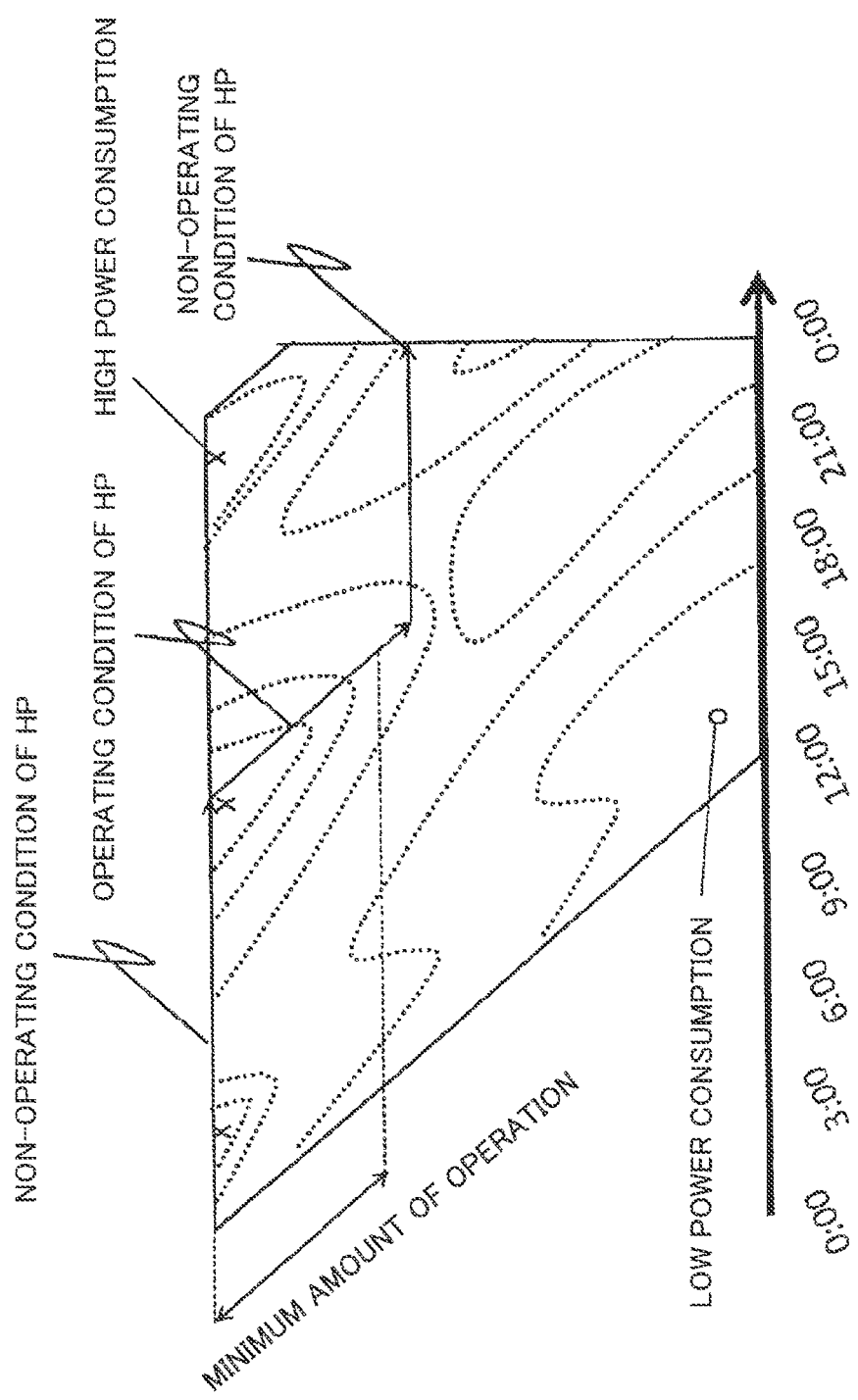
FIG. 9 is a diagram for describing a method of determining an operating schedule from the power consumption at each time during a discharge period of the heat pump water heater illustrated in FIG. 5.

FIG. 9 is a diagram for describing a method of determining an operating schedule from the power consumption at each time during a discharge period of the heat pump water heater 70 illustrated in FIG. 5. FIG. 9 is a graph obtained by converting the three-dimensional graph acquired in FIG. 8 to contour display.

In order to absorb the surplus of the power of the photovoltaic power generation, the heat pump water heater 70 is operated at a time when the sum of the power consumption of the heat pump water heater 70 is the largest among times when the surplus of the power is generated. Accordingly, power supply and demand can be performed more efficiently. In other words, operation start time may be set such that a straight line indicating the operating condition of the heat pump water heater 70 is a straight line having the largest power consumption in FIG. 9. As the energy acquired in the straight line indicating the operating condition of the heat pump water heater 70, a value larger than the minimum necessary energy of demand of hot-water supply acquired by the operating time acquisition unit 21 is set. Adjustment to desired power consumption is possible by changing the setting of the boiling-up temperature during the operation of the heat pump water heater 70 by the equation (3) and adjusting the result illustrated in FIG. 9.

Modified Example

The above-described energy control method can also be performed without using the upper-level information processing device 10.

FIG. 10 is a diagram illustrating a basic configuration of an information processing device that performs energy control without using an upper-level information processing device.

In the configuration, as illustrated in FIG. 10, a plurality of electric devices 230-1 to 230-$n$ are connected to one information processing device 220.

The information processing device 220 corresponds to an energy control device of the present invention. The information processing device 220 has a parameter acquisition unit 226, a power consumption estimation unit 224, and a control value setting unit 225.

The parameter acquisition unit 226 corresponds to the parameter acquisition means of the present invention. With respect to the connected electric devices 230-1 to 230-$n$, the parameter acquisition unit 226 acquires parameters for estimating power consumption in accordance with statuses of the electric devices 230-1 to 230-$n$.

The power consumption estimation unit 224 corresponds to a power consumption estimation means of the present invention. The power consumption estimation unit 224 estimates the power consumption of the electric devices 230-1 to 230-$n$ on the basis of the parameters acquired by the parameter acquisition unit 226.

The control value setting unit 225 corresponds to a control value setting means of the present invention. The control value setting unit 225 determines assignments of distribution of supply and demand to the electric devices 230-1 to 230-$n$ on the basis of a power supply-and-demand capacity in a predetermined power network and the power consumption of the electric devices 230-1 to 230-$n$ estimated by the power consumption estimation unit 224. Then, the control value setting unit 225 controls operations of the electric devices 230-1 to 230-$n$ on the basis of the determined assignments to adjust power supply with respect to the electric devices 230-1 to 230-$n$.

FIG. 11 is a block diagram illustrating a functional configuration of the information processing device 220 illustrated in FIG. 10.

As illustrated in FIG. 11, the information processing device 220 includes an operating time acquisition unit 221, an environmental information acquisition unit 222, an internal information acquisition unit 223, the power consumption estimation unit 224, and the control value setting unit 225 as with the lower-level information processing device illustrated in FIG. 3. The operating time acquisition unit 221, the environmental information acquisition unit 222, and the internal information acquisition unit 223 constitute the parameter acquisition unit 226 illustrated in FIG. 10. Each of the electric devices 230-1 to 230-$n$ has a power consumption unit 231, a device operating unit 232, and a various sensors unit 233.

The operating time acquisition unit 221, the environmental information acquisition unit 222, the internal information acquisition unit 223, and the power consumption estimation unit 224 operate in the same manner as the power consumption estimation unit illustrated in FIG. 3.

The control value setting unit 225 determines the assignments of distribution of supply and demand to the electric devices 230-1 to 230-$n$ on the basis of a power supply-and-demand capacity in a power network 244, an estimated value of the power consumption estimated by the power consumption estimation unit 224, and time information acquired by the operating time acquisition unit 221. Then, the control value setting unit 225 control the operations of the electric devices 230-1 to 230-$n$ on the basis of the determined assignments to adjust the power supply with respect to the electric devices 230-1 to 230-$n$.

As just described, the power supply can be adjusted in household electric devices, for example, without using an upper-level information processing device.

As described above, when electric devices of a consumer are used, the power supply-and-demand adjustment function in the present invention quantifies a demand adjustment capacity, and sets an appropriate demand schedule. Accordingly, the effect of demand response can be clarified, and the concurrent use of another distribution of supply and demand can be made easy.

When it is assumed that targeted consumer's devices are operated at each time hereafter, by exhaustively expressing the power consumption of the targeted consumer's devices in the forms illustrated in FIG. 8 and FIG. 9, the setting of a schedule of demand response can be made easy.

A part or all of the above-described exemplary embodiments can also be described as the following supplementary notes, but are not limited thereto.

Supplementary Note 1

An energy control system comprising:
a lower-level information processing device that controls operation of an electric device to adjust power supply with respect to the electric device; and an upper-level information processing device that communicates with the lower-level information processing device, wherein the lower-level information processing device acquires a parameter for estimating power consumption in accordance with a status of the electric device, estimates the power consumption of the electric device on the basis of the parameter, and transmits estimated value of the estimated power consumption to the upper-level information processing device, the upper-level information processing device determines, on the basis of a power supply-and-demand capacity in a predetermined power network and the estimated value, an assignment of distribution of supply and demand of power to the electric device in the power network, and transmits the determined assignment to the lower-level information processing device, and the lower-level information processing device controls the operation of the electric device on the basis of the assignment to adjust the power supply with respect to the electric device.

Supplementary Note 2

The energy control system according to supplementary note 1, wherein
the lower-level information processing device includes:
environmental information acquisition unit that acquires at least one piece of environmental information among an ambient temperature, an ambient temperature, the amount of solar radiation, and a consumer's behavior, as the parameter,
internal information acquisition unit that acquires operating condition information indicating an operating condition of the electric device, as the parameter;
power consumption estimation unit that estimates the power consumption of the electric device on the basis of the environmental information and the operating condition information; and
control value setting unit that transmits the estimated power consumption to the upper-level information processing device, and controls the operation of the electric device on the basis of the assignment of distribution determined by the upper level information processing device on the basis of the estimated value of the power consumption to adjust the power supply with respect to the electric device.

Supplementary Note 3

The energy control system according to supplementary note 2, wherein
the lower-level information processing device includes operating time acquisition unit that acquires time information indicating scheduled operating time when the electric device is operated, as the parameter,
the control value setting unit transmits the time information and at least power efficiency information indicating power efficiency of the electric device of information included in the operating condition information to the upper-level information processing device together with the estimated power consumption, and
the upper-level information processing device determines the assignment of distribution such that an electric device having the power efficiency at a certain level or more operates at a time when the power supply of the entire power network is a predetermined value or more, and an electric device having the power efficiency at less than the certain level operates at a time when the power supply is less than the predetermined value.

Supplementary Note 4

The energy control system according to any one of supplementary notes 1 to 3, wherein
the lower-level information processing device calculates an internal state of the electric device in the case where the electric device is not operated, and estimates the power consumption in the case where the electric device is then operated, on the basis of the internal state.

Supplementary Note 5

The energy control system according to any one of supplementary notes 1 to 4, wherein
the lower-level information processing device calculates three-dimensional information of the estimated value of the power consumption with an axis of future elapsed time and another axis of operation elapsed time of the electric device, on the basis of the parameter.

Supplementary Note 6

An energy control device comprising:
parameter acquisition unit that acquires, with respect to at least two electric devices, parameters for estimating power consumption in accordance with statuses of the electric devices;
power consumption estimation unit that estimates the power consumption of the electric devices or the basis of the parameters; and
control value setting unit that determines, on the basis of a power Supply-and-demand capacity in a predetermined power network and the estimated values, assignments of distribution of Supply and demand of power to the electric devices in the power network, and controls operations of the electric devices on the basis of the assignments to adjust power supply with respect to the electric devices.

Supplementary Note 7

An energy control method comprising:
parameter acquisition processing of acquiring, with respect to at least two electric devices, parameters for estimating power consumption in accordance with statuses of the electric devices;
power consumption estimation processing of estimating the power consumption of the electric devices on the basis of the parameters;
assignment determination processing of determining, on the basis of a power supply-and-demand capacity in a predetermined power network and the estimated values, assignments of distribution of supply and demand of power to the electric devices in the power network; and
adjustment processing of controlling operations of the electric devices on the basis of the assignments to adjust power supply with respect to the electric devices.

Supplementary Note 8

A storage medium storing a program for making a computer execute:

a parameter acquisition procedure for acquiring, with respect to at least two electric devices, parameters for estimating power consumption in accordance with statuses of the electric devices;

a power consumption estimation procedure for estimating the power consumption of the electric devices on the basis of the parameters;

an assignment determination procedure for determining, on the basis of a power supply-and-demand capacity in a predetermined power network and the estimated values, assignments of distribution of supply and demand of power to the electric devices in the power network; and an adjustment procedure for controlling operations of the electric devices on the basis of the assignments to adjust power supply with respect to the electric devices.

Although the present invention has been described with reference to the exemplary embodiments, the present invention is not limited to the above-described exemplary embodiments. Various modifications that a person skilled in the art can understand can be made to configurations and details of the present invention within the scope of the present invention.

This application claims priority based on Japanese Patent Application No. 2014-92795 filed on Apr. 28, 2014, the entire contents of which are incorporated herein.

The invention claimed is:

1. An energy control system comprising:
a lower-level nformation processing device that controls operation of an electric device to adjust power supply with respect to the electric device; and
an upper-level information processing device that communicates with the lower-level information processing device, wherein
the lower-level information processing device acquires a parameter for estimating power consumption in accordance with a status of the electric device, estimates the power consumption of the electric device on the basis of the parameter, and transmits an estimated value of the estimated power consumption to the upper-level information processing device,
the upper-level information processing device determines, on the basis of a power supply-and-demand capacity in a predetermined power network and the estimated value, an assignment of distribution of supply and demand of power to the electric device in the power network, and transmits the determined assignment to the lower-level information processing device, and
the lower-level information processing device controls the operation of the electric device on the basis of the assignment to adjust the power supply with respect to the electric device;
wherein the lower-level information processing device includes:
an environmental information acquisition unit configured to acquire at least one piece of environmental information among an ambient temperature, an ambient humidity, an amount of solar radiation and a consumer's behavior, as the parameter;
an internal information acquisition unit configured to acquire operating condition information indicating an operating condition of the electric device as the parameter;
a power consumption estimation unit configured to estimate the power consumption of the electric device on the basis of the environmental information and the operating condition information; and
a control value setting unit configured to transmit the estimated power consumption to the upper-level information processing device, and to control the operation of the electric device on the basis of the assignment of distribution determined by the upper-level information processing device on the basis of the estimated value of the power consumption to adjust the power supply with respect to the electric device; and
an operating time acquisition unit configured to acquire time information indicating a scheduled operating time when the electric device is operated, as the parameter, wherein
the control value setting unit transmits the time information and at least power efficiency information indicating power efficiency of the electric device of information included in the operating condition information to the upper-level information processing device together with the estimated power consumption, and
the upper-level information processing device determines the assignment of distribution such that an electric device having the power efficiency at a certain level or more operates at a time when the power supply of the entire power network is at a predetermined value or more, and an electric device having the power efficiency at less than the certain level operates at a time when the power supply is at less than the predetermined value.

2. The energy control system according to claim 1, wherein
the lower-level information processing device calculates an internal state of the electric device in the case where the electric device is not operated, and estimates the power consumption in the case where the electric device is then operated, on the basis of the internal state.

3. The energy control system according to claim 1, wherein
the lower-level information processing device calculates three-dimensional information of the estimated value of the power consumption with an axis of time and another axis of operation elapsed time of the electric device, on the basis of the parameter.

4. The energy control system according to claim 2, wherein
the lower-level information processing device calculates three-dimensional information of the estimated value of the power consumption with an axis of time and another axis of operation elapsed time of the electric device, on the basis of the parameter.

5. An energy control device comprising:
a parameter acquisition unit configured to acquires, with respect to at least two electric devices, parameters for estimating power consumption in accordance with statuses of the electric devices;
a power consumption estimation unit configured to estimate the power consumption of the electric devices on the basis of the parameters; and
a control value setting unit configured to determine, on the basis of a power supply-and-demand capacity in a predetermined power network and an estimated values of the estimated power consumption, assignments of distribution of supply and demand of power to the electric devices in the power network, and controls operations of the electric devices on the basis of the assignments to adjust power supply with respect to the electric devices;

an environmental information acquisition unit configured to acquire at least one piece of environmental information among an ambient temperature, and ambient humidity, and amount of solar radiation, and a consumer's behavior, as the parameter;

an internal information acquisition unit configured to acquire operating condition information indicating an operating condition of the electric device as the parameter;

a power consumption estimation unit configured to estimate the power consumption of the electric device on the basis of the environmental information and the operating condition information;

a control value setting unit configured to transmit the estimated power consumption to an upper-level information processing device, and to control the operating of the electric device on the basis of assignment of distribution determined by the upper-level information processing device on the basis of the estimated value of the power consumption to adjust the power supply with respect to the electric device; and an operating time acquisition unit configured to acquire time information indicating a scheduled operating time when the electric device is operated, as the parameter; wherein the control value setting unit transmits the time information and at least power efficiency information indicating power efficiency of the electric device of information included in the operating condition information to the upper-level information processing device together with the estimated power consumption; and the upper-level information processing device determines the assignment of distribution such that an electric device having the power efficiency at a certain level or more operates at a time when the power supply of the entire power network is at predetermined value or more, and an electric device having the power efficiency at less than the certain level operates at a time when the power supply is at less than the predetermined value.

6. An energy control method comprising:
by an information processing apparatus,
acquiring, with respect to at least two electric devices, parameters for estimating power consumption in accordance with statuses of the electric devices;
acquiring at least one piece of environmental information among an ambient temperature, and ambient humidity, and amount of solar radiation, and a consumer's behavior, as a parameter;
acquiring operating condition information indicating an operating condition of the electric device as the parameter;
acquiring time information indicating a schedule operating time when the electric device is operated, as the parameter;
estimating the power consumption of the electric devices on the basis of the parameters;
determining assignments of distribution such that an electric device having a power efficiency of the electric device at a certain level or more operated at a time when the power supply of the entire power network is at a predetermined value or more, and an electric device having the power efficiency at less than the certain level operates at a time when the power supply is at less than the predetermined value; and
controlling operations of die electric devices on the basis of the assignments of distribution determined by an upper-level information processing device on the basis of an estimated value of the power consumption to adjust power supply with respect to the electric devices.

7. A non-volatile storage medium storing a program for making a computer execute:
a parameter acquisition procedure for:
acquiring, with respect to at least two electric devices, parameters for estimating power consumption in accordance with statuses of the electric devices;
acquiring at least one niece of environmental Information among an ambient temperature, an ambient humidity, an amount of solar radiation, and a consumer's behavior, as a parameter;
acquiring operating condition information indicating an operating condition of the electric device as the parameter;
acquiring time information indicating a scheduled operating time when the electric device is operated, as the parameter;
a power consumption estimation procedure for estimating the power consumption of the electric devices on the basis of the parameters;
an assignment determination procedure for determining assignments of distribution such that an electric device having a power efficiency of the electric device at a certain level or more operates at a time when the power supply of the entire power network is at a predetermined value or more, and an electric device having the power efficiency at less than the certain level operates at a time when the power supply is at less than the predetermined value; and
an adjustment procedure for controlling operations of the electric devices on the basis of the assignments of distribution determined by an upper-level information processing device on the basis of an estimated value of the power consumption to adjust power supply with respect to the electric devices.

* * * * *